3,686,187
4-ANILINO-1-(4-p-FLUOROPHENYL-1-BUTYL) PIPERIDINE COMPOUNDS

John Wayne Cole, Deerfield, and Robert Hallas, Waukegan, Ill., assignors to Abbott Laboratories, North Chicago, Ill.
No Drawing. Filed May 25, 1970, Ser. No. 40,375
Int. Cl. C07d 29/28
U.S. Cl. 260—293.79          8 Claims

ABSTRACT OF THE DISCLOSURE

A new series of piperidine derivatives has been discovered; they are compounds carrying, in the 4-position of the piperidine ring, a substituted anilino group and in the 1-position, a p-fluorophenyl ring separated from the piperidine ring by a carbon chain of 4. These new compounds and their non-toxic acid addition salts are highly effective analgesics of low toxicity.

DETAILED DESCRIPTION OF THE INVENTION

The present invention is directed to 1,4-disubstituted piperidine derivatives of the formula

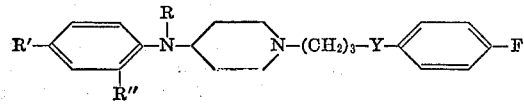

wherein R' is fluorine, chlorine or methoxy, R" is hydrogen, fluorine or methyl, R is hydrogen or methyl and Y is carbonyl or methylene. The above compounds and their non-toxic acid addition salts show pronounced analgesic activity with oral $ED_{50}$ values ranging between 3 and 30 mg./kg. while their toxicities, for the most part, show oral $LD_{50}$ values of 300 to 750 mg./kg. The therapeutic index values are generally between 15 and 50.

The new compounds of the present invention are made by simple and known procedural steps. In a general embodiment, the above 3-ring containing compounds are prepared by condensing the piperidine moiety first with the properly substituted aniline derivative and subsequently introducing the p-fluorophenylalkyl chain which may carry oxygen in the α-position. The compounds wherein R is methyl can be made from the corresponding 3-ring compounds wherein R is hydrogen or, the methyl group can be introduced into the 2-ring intermediate. The condensation for the 2-ring intermediate is usually carried out by condensing 4-piperidone, carrying a protective group on the nitrogen, with the corresponding aniline, followed by reduction of the obtained Schiff base and cleavage of the protective group. As mentioned, the methyl group can be introduced at this point, if desired, prior to the condensation to the 3-ring unit.

The condensation of the 4-(substituted anilino)piperidine can be carried out with a fluorobutyrophenone derivative to produce the compound of the above structure wherein Y is carbonyl. The corresponding compound wherein Y is methylene can be made from the preceding compound by hydrogenation in known fashion or, the 2-ring intermediate is condensed with 4-chloro-1-(p-fluorophenyl)-1-butene, followed by catalytic hydrogenation.

The compounds wherein Y is a carbonyl group can easily be converted into the corresponding oximes or methoxyimines. These derivatives are also active as analgesics but require considerably higher doses because they are less effective than the above compounds.

A convenient form for administration of the above compounds to patients requiring treatment with analgesics is the oral route. For this route, the preferred component is a non-toxic acid addition salt of the above described 3-unit compound, for instance, the hydrochloride, sulfate, phosphate, acetate, citrate, tartrate or succinate. These salts can easily be granulated and/or compounded into common dosage forms using the usual excipients, flavoring agents, fillers and the like often used in pharmaceutical tablets or suspensions. Other active components may be combined with the above active ingredients and the granules or tablets may be coated in usual fashion.

In order to illustrate the preparation of specific compounds of the present invention, reference is made to the following examples which, however, are not meant to limit the scope of this invention in any fashion. In all these examples, the compounds named were identified by chemical analysis, showing excellent agreement with their calculated formulas.

Example 1.—N-[3-(p-fluorobenzoyl)propyl]-4-(p-fluoroanilino)piperidine (a) 1-carbethoxy-4-piperidone.—A solution of 83.6 g. of 4,4-diethoxypiperidine and 60.6 g. of triethylamine dissolved in 500 ml. of ether was cooled in an ice bath to below 10° C. To this solution, 60.0 g. of ethyl chloroformate was added dropwise, keeping the temperature below 15° C. At the end of the addition, the reaction mixture was stirred at room temperature overnight. After this time, the reaction mixture was filtered to remove the triethylamine hydrochloride and the filter cake was washed with fresh ether. The filtrate was concentrated by heating on a steam bath. The residue was dissolved in 500 ml. of ethyl alcohol and this solution was diluted with 50 ml. of concentrated hydrochloric acid and 50 ml. of water. This solution was heated on a steam bath to reflux for five minutes then concentrated in vacuo. The residue was dissolved in chloroform, the layers were separated and the organic layer was dried over magnesium sulfate, filtered and concentrated to leave a colorless oil which was purified by vacuum distillation; B.P. 100°/2 mm.; $N_D^{25°}$ 1.4716.

(b) N-(1-carbethyl-4-piperidylidene)-p-fluoroaniline.—A solution of 11.1 g. of p-fluoroaniline, 17.1 g. of 1-carbethoxy-4-piperidone, 500 mg. of p-toluenesulfonic acid hydrate in 250 ml. of toluene was heated to reflux and the water formed was collected by a Dean-Stark water separator. After refluxing for 24 hours, 1.9 ml. of water was collected (theory 1.8 ml.). The reaction mixture was washed with a 5% sodium bicarbonate solution. The layers were separated and the organic layer was dried over magnesium sulfate, filtered and concentrated to leave an oil. The oil was distilled by vacuum distillation. B.P. 158°/2 mm.; $N_D^{25°}$ 1.5325, and was obtained in a yield of 18 g.

(c) 1-carbethoxy-4-(p-fluoroanilino)piperidine.—A solution of 17.7 g. of N-(1-carbethoxy-4-piperidylidene)-p-fluoroaniline dissolved in 125 ml. of ethanol was hydrogenated at 3 atmospheres pressure in the presence of 3.5 g. 5% palladium on charcoal. When uptake was complete, the mixture was filtered and the catalyst was washed with fresh solvent. The filtrate was concentrated to leave an oil which crystallized. This product was purified by recrystallization from acetone-hexane and was obtained in a yield of 14.46 g. (81%); M.P. 85–6° C.

(d) 4-(p-fluoroanilino)piperidine.—A suspension of 14.2 g. of 1-carbethoxy-4-(p-fluoroanilino)piperidine in 250 ml. of 6 N HCl was heated to reflux for 24 hours. The resulting solution was concentrated to remove most of the solvent. The mixture was made basic with 50% aqueous sodium hydroxide while cooling in an ice bath. A solid separated and the aqueous layer was extracted with 3 portions of 250 ml. each of chloroform. The layers were separated and the organic layer was dried over $MgSO_4$, filtered and concentrated to leave a pale, yellow colored solid. Recrystallized from acetone-hexane yielded the pure compound melting at 112–113° C.

(e) Propylene ketal of γ-chloro-p-fluorobutyrophenone.—A solution of 100 g. of γ-chloro-p-fluorobutyrophenone, 50 ml. of propylene glycol and 800 mg. of p-toluenesulfonic acid hydrate in 600 ml. of benzene was heated to reflux for 48 hours. After this time, the reaction mixture was washed with 300 ml. of 5% aqueous potassium carbonate. The organic layer was dried over MgSO$_4$, filtered and concentrated to leave a golden colored oil. Vacuum distillation produced a colorless oil, B.P. 108°/0.75 mm.; N$_D^{25°}$ 1,4958 in a yield of 88.68 g.

(f) N - [3 - (p - fluorobenzoyl)propyl]-4-(p-fluoroanilino)piperidine.—A solution of 10.4 g. of 4-(p-fluoroanilino)piperidine, 14.5 g. of the propylene ketal of γ-chloro-p-fluorobutyrophenone, 7.8 g. of potassium carbonate and 9.4 g. of potassium iodide in 120 ml. of dimethylformamide was heated at 100° C. for 20 hours. The inorganic salts were then removed by filtration and the filtrate was evaporated. The residue was dissolved in chloroform and washed with cold water. The organic layer was concentrated, leaving an oil which was dissolved in 160 ml. of ethyl alcohol, diluted with 40 ml. of water and 20 ml. of concentrated hydrochloric acid. This solution was refluxed for five minutes and then concentrated to a pasty solid. The residue was dissolved in water and made basic with 50% aqueous sodium hydroxide under cooling. An oil separated; the aqueous layer was extrated with 3 portions of 250 ml. each of chloroform. The organic layer was dried over MgSO$_4$, filtered and concentrated to leave a solid. The solid was purified by recrystallization from ethyl alcohol, yielding 14.23 g. (74%) of the pure product, melting at 115–117° C.

Example 2.—N-[3-(p-fluorobenzoyl)propyl]-4-(p-fluoroanilino)piperidine dihydrochloride This salt was prepared by dissolving 3.58 g. of the compound of Example 1(f) in 100 ml. of ethyl alcohol and two equivalents of gaseous anhydrous hydrochloric acid dissolved in ethanol were added. The white solid which formed was removed by filtration and washed with fresh alcohol. This solid was purified by recrystallization from ethyl alcohol to yield 3.71 g. of the salt, melting at 195–198° C.

Example 3.—N-[4-(p-fluorophenyl)-3-butenyl]-4-(p-fluoroanilino)piperidine dihydrochloride A solution of 3.88 g. of 4-(p-fluoroanilino)piperidine, 3.70 g. of 4-chloro-1-(p-fluorophenyl)-1-butene, 3.0 g. of potassium carbonate and 3.3 g. of potassium iodide in 100 ml. of 4-methyl-2-pentanone was heated to reflux for 72 hours. At the end of this time, the reaction mixture was filtered to remove the inorganic salts which formed. The filtrate was concentrated to leave a reddish colored oil. The dihydrochloride was made as shown in Example 2; it was recrystallized from ethyl alcohol to yield 3.84 g. melting at 206–10° C.

Example 4.—N-[4-(p-fluorophenyl)butyl]-4-(p-fluoroanilino)piperidine dihydrochloride A mixture of 14.33 g. of N-[3-(p-fluorobenzoyl)propyl]-4-(p-fluoroanilino)piperidine dissolved in 150 ml. of acetic acid and 100 ml. of water containing 3 equivalents of concentrated hydrochloric acid and 3 drops of 10% perchloric acid in acetic acid was hydrogenated at 3 atmospheres pressure in the presence of 4.5 g. of 5% palladium on charcoal. When hydrogen uptake was completed, the mixture was filtered and the catalyst was washed with fresh solvent. The filtrate was evaporated to leave a semisolid which was dissolved in water and made basic with 50% aqueous sodium hydroxide under cooling. The oil which separated was extracted with chloroform and the extracts were combined, dried over MgSO$_4$, filtered and concentrated to leave 13.45 g. of a yellow oil. A sample of this material showed no carbonyl or hydroxy groups upon infra-red inspection. The salt was made as shown in Example 2 and showed a melting point of 192–194° C.; it was obtained in a yield of 12.1 g.

The same compound was also obtained by hydrogenating the compound of Example 3 with platinum oxide as the catalyst and dimethylformamide/acetic acid as the reaction medium.

Example 5.—N - [3-(p-fluorobenzoyl)propyl] - 4 - (p-methoxyanilino)piperidine (a) 4-(p-methoxyanilino)piperdine.—A solution of 36.2 g. of 1-benzyl-4-(p-methoxyanilino)piperidine (C.A. 62, 14634 of 1965) in 250 ml. of ethanol was hydrogenated at 3 atmospheres in the presence of 5.2 g. of 5% palladium on charcoal till the uptake was complete (about 15 hours). The catalyst was filtered off and washed with ethanol. The combined wash liquor and filtrate was evaporated and the residual oil was purified by a vacuum distillation (175° C./3 mm.), yielding 18.3 g. of the pure material melting at 70–72° C.

(b) N - [3 - (p-fluorobenzoyl)propyl]-4-(p-methoxyanilino)piperdine.—By substituting 4-(p-methoxyanilino)piperidine for the corresponding p-fluoroanilino derivative in Example 1(f), the process described there yields 5.86 g. (81.5%) of the new compound of formula C$_{22}$H$_{27}$FN$_2$O$_2$, melting at 83–4° C. after recrystallization from isopropyl alcohol.

Example 6.—N-[3-(p-fluorobenzoyl)propyl]-4-(p-methoxy-N-methylanilino)piperidine dihydrochloride To a solution of 5.55 g. of N-[3-(p-fluorobenzoyl)-propyl]-4-(p-methoxyanilino)piperidine in 40 ml. of 90% formic acid was added 4.5 ml. of 37% aqueous formaldehyde. Carbon dioxide evolution gas was noticed. The solution was heated at 100° C. for 24 hours. After this period of time, the reaction mixture was diluted with 50 ml. of 10% aqueous hydrochloric acid and evaporated. The residue which remained was dissolved in 150 ml. of water and made basic by adding 50% aqueous sodium hydroxide under cooling. The aqueous mixture was extracted with 3 portions of 250 ml. of chloroform. The extracts were combined, dried over MgSO$_4$, filtered and evaporated to leave an oil. The dihydrochloride was made as described in Example 2 and purified by recrystallization from ethyl alcohol, yielding 3.61 g. of the pure salt melting at 223–226° C.

Example 7.—N-[3-(p-fluorobenzoyl)propyl]-4-(2-methyl-4-fluoroanilino)piperidine (a) N-(1-carbethoxy - 4 - piperidylidene)-2-methyl-4-fluoroaniline.—A solution of 25.9 g. of 2-methyl-4-fluoroaniline, 36.0 g. of 1-carbethoxy-4-piperidone, and 500 mg. of p-toluenesulfonic acid hydrate in 400 ml. of toluene was refluxed for 24 hours and worked up as in Example 1(b). The crude product was purified by a vacuum distillation (170° C./2 mm.) yielding 47.16 g.; N$_D^{25°}$ 1.5268.

(b) 1-carbethoxy - 4 - ( 2-methyl-4-fluoroanilino)piperidine.—By following the process of Example 1(c) using the preceding compound as the starting material, 38.81 g. of 1 - carbethoxy-4-(2-methyl-4-fluoroanilino)piperidine, melting at 104–5° C. was obtained after recrystallization from acetone-hexane.

(c) 4-(2 - methyl - 4 - fluoroanilino)piperidine.—This compound was obtained from the derivative described in (b) above by following the procedure of Example 1(d). It is a liquid, boiling at 120° C./1 mm.; N$_D^{25°}$ 1.5500.

(d) N-[3-(p - fluorobenzoyl)propyl] - 4 - (2-methyl-4-fluoroanilino)piperidine.—This compound was made in the manner described in Example 1(f) except that 4-(2-methyl-4-fluoroanilino)piperidine was substituted for the 4-(p-fluoroanilino)piperidine. The new compound was recrystallized from isopropyl alcohol and was obtained in a yield of 5.85 g.; M.P. 110–112.5° C.

Example 8.—N-[3-(p-fluorobenzoyl)propyl]-4-(2,4-difluoroanilino)piperidine (a) N-(1 - benzyl - 4 - piperidylidene)-2,4-difluoroaniline.—This compound was made from 2,4-difluoroaniline and 1-benzyl-4-piperidone, using the procedure of Example 1(b). The pure compound was obtained by recrystallization from ether-pentane; it melts at 90–92° C.

(b) 1-benzyl-4-(2,4-difluoroanilino)piperidine.—To a suspension of 12.0 g. of lithium aluminum hydride in 300 ml. of ether, a solution of 37.0 g. of N-(1-benzyl-4-piperidylidene)-2,4-difluoroaniline in 200 ml. ether was added at a rapid rate. At the end of the addition, the reaction mixture was refluxed for 20 hours. At the end of this time, the hydride complex was decomposed by adding, in sequence and with cooling, 12 ml. of distilled water, 12 ml. of 15% aqueous sodium hydroxide and a separate portion of 36 ml. of water. The salts which formed were removed by filtration and the filter cake was washed with fresh ether. The filtrate was evaporated to leave a tan solid. This solid was purified by recrystallization from ether-pentane to yield 33.89 g. of the compound of formula $C_{18}H_{20}F_2N_2$, melting at 73–4° C.

(c) 4-(2,4 - difluoroanilino)piperidine.—1 - benzyl - 4 - (2,4-difluoroanilino)piperidine was debenzylated under the same conditions as in Example 5(a). The crude product was purified by recrystallization from acetone-hexane; the pure compound melted at 78–80° C.

(d) N - [3 - (p-fluorobenzoyl)propyl]-4-(2,4-difluoroanilino)piperidine.—This product was prepared by heating a solution of 4.24 g. of 4-(2,4-difluoroanilino)piperidine, 5.5 g. of propylene ketal of γ-chloro-p-fluorobutyrophenone, 3.3 g. of potassium iodide and 2.9 g. of potassium carbonate for 20 hours. The product was isolated under the same conditions as in Example 1(f) and purified by recrystallization from isopropyl alcohol. Yield 2.04 g.; M.P. 93–94.5° C.

Example 9.—N-[3-(p-fluorobenzoyl)propyl]-4-(p-chloroanilino)piperidine (a) N - (1 - carbethoxy - 4 - piperylidene) - p-chloroaniline.—A solution of 12.7 g. of p-chloroaniline, 17.1 g. of carbethoxy-4-piperidone, and 500 mg. of p-toluenesulfonic acid hydrate in 200 ml. of toluene was treated and worked up as shown in Example 1(b). A crude yield of 29 g. of the compound of formula $C_{14}H_{17}ClN_2O_2$ was obtained.

(b) 1 - carbethoxy - 4-(p-chloroanilino)piperidine.—A solution of 29 g. of the crude material of the preceding section in 250 ml. of ethyl alcohol was hydrogenated at 3 atmospheres pressure in the presence of 4.0 g. of 5% platinum on carbon. The reaction was run and worked up as in Example 1(c). The product was purified by a recrystallization from acetone-hexane. Yield 14.01 g.; M.P. 114–116° C.

(c) 4 - (p - chloroanilino)piperidine.—13.8 g. of 1-carbethoxy-4-(p-chloroanilino)piperidine was hydrolyzed and the product was isolated in the same manner as described in Example 1(d). The product was recrystallized from acetone-hexane, yielding 8.18 g. of the pure compound of formula $C_{11}H_{15}ClN_2$, melting at 109–11° C.

(d) N-[3-(p-fluorobenzoyl)propyl]-4-(p-chloroanilino)piperidine.—By following the procedure of Example 1(f) but using the above compound for the condensation with the propylene ketal, the desired compound of formula $C_{21}H_{24}ClFN_2O$ is obtained in good yield.

Example 10.—N - [3 - (p - fluorobenzoyl)propyl]-4-(2-methyl-4-methoxyanilino)piperidine dihydrochloride (a) N-(1-benzyl-4-piperidylidene)-2-methyl-4-methoxyaniline.—A solution of 27.4 g. of 2-methyl-4-methoxyaniline, 37.9 g. of 1-benzyl-4-piperidone and 500 mg. of p-toluenesulfonic acid hydrate in 400 ml. of toluene was treated and worked up as in Example 1(b) to produce a crude yield of 62.0 g. This material was used as it is without further purification.

(b) 1 - benzyl - 4 - (2-methyl-4-methoxyanilino)piperidine.—By following the procedure of Example 8 with 62.0 g. of the material from the preceding section, the desired compound of formula $C_{20}H_{26}N_2O$ was obtained. It was purified by recrystallization from acetone-hexane to yield 34.28 g. of the pure compound melting at 92–3° C.

(c) 4 - (2 - methyl - 4 - methoxyanilino)piperidine.—The product of Example 10(b) was debenzylated under the same conditions as used in Example 5(a). The crude product was purified by vacuum distillation (B.P. 150° C./2 mm.) and 15.94 g. (75%) of the pure compound of formula $C_{12}H_{20}N_2O$ was obtained; $N_D^{25°}$ 1.5668.

(d) N - [3 - (p-fluorobenzoyl)propyl]-4-(2-methyl-4-methoxyanilino)piperidine dihydrochloride.—The above compound was treated with γ-chloro-p-fluorobutyrophenone propylene ketal in the same fashion as described in Example 1(f) and the hydrochloride salt was prepared as in Example 2. The crude product was recrystallized from ethyl alcohol to produce the desired compound of formula $C_{23}H_{31}Cl_2FN_2O_2$ in a yield of 57.5%; M.P. 237° C. (dec.)

Example 11.—N-[4-(p-fluorophenyl)butyl]-4-(p-fluoro-N-methylanilino)piperidine dihydrochloride To 13.2 g. of N-[4-(p-fluorophenyl)butyl]-4-(p-fluoroanilino)piperidine dissolved in 80 ml. of formic acid was added 15 ml. of 37% aqueous formaldehyde. The reaction was run and worked up as in Example 6. The obtained dihydrochloride of the compound of formula $C_{22}H_{30}Cl_2F_2N_2$ was recrystallized from ethyl alcohol and obtained in a yield 9.95 g.; M.P. 208–211° C.

Example 12.—N-[4-(p-fluorophenyl)butyl]-4-(p-methoxyanilino)piperidine dihydrochloride 10.6 g. of N-[3(p-fluorobenzoyl)propyl]-4-(4-methoxyanilino)piperidine was hydrogenated under the conditions described in Example 4. The obtained crude dihydrochloride salt was recrystallized from ethyl alcohol and obtained in a yield 7.55 g.; M.P. 210–213° C.

Example 13.—N-[4-(p-fluorophenyl)butyl]-4-(2,4-difluoroanilino)piperidine dihydrochloride By using the conditions of Example 4 using 9.0 g. of the compound of Example 8(d) as the starting material, the desired compound of formula $C_{21}H_{25}F_3N_2$ was obtained and isolated as the dihydrochloride salt in a yield 4.21 g. The pure salt melts at 189–191° C. (dec.) after recrystallization from ethyl alcohol.

Example 14

To test the analgesic activity of the new compounds of the present invention, the method of Woolfe and MacDonald, Journal of Pharmacology and Exp. Therapy, vol. 80, page 300 (1944) was used. The compounds described in Examples 1–13 all have $ED_{50}$ values of between 3.6 and 30.5 mg./kg. Specifically, the compound of Example 6 was found to have an oral $ED_{50}$ of 5.9 and an oral $LD_{50}$ of 150 mg./kg. The corresponding values of Example 10 are 12.6 and 300 respectively. The compound of Example 13 shows an oral $ED_{50}$ of 22.9 mg./kg. and an oral $LD_{50}$ of 750 mg./kg.

As mentioned above, and as demonstrated in Example 14, the oral toxicities are very low in view of the extremely low values for effective doses with therapeutic index values as high as 97.5, for instance, in the compound of Example 7. The new compounds are particularly well suited for oral administration to warm-blooded animals. In lower animals, the dosage ranges from 1–10 mg./kg. while the recommended oral dose for a single administration to adult patients is between 6 and 30 mg.

The new compounds distinguish over older, known compounds in some specific characteristics which need to be present for the high activity and low toxicity shown above. These characteristics are the presence of 3 rings, the phenyl ring being spaced from the N-position of the piperidine by a chain of 4 carbon atoms, the substitution with the anilino moiety in the 4-position of the piperidine ring without other linking atoms and the presence of negative substituents in the p-positions of both phenyl rings. The anilino-nitrogen may carry a methyl group but other substituents tend to reduce the favorable therapeutic index.

The compounds of the present invention may be administered orally in their free form or in the form of a non-toxic acid addition salt. The latter form is preferred because of the general ease of handling, compounding and tableting of such salts.

We claim:
1. A compound of the formula

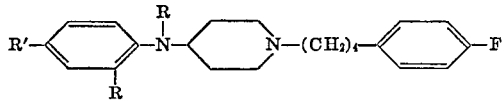

wherein R is hydrogen or methyl, R' is fluorine, chlorine or methoxy, R" is hydrogen, fluorine or methyl or a non-toxic acid addition salt thereof.

2. The compound of claim 1 wherein R and R" are hydrogen and R' is methoxy.

3. The compound of claim 1 wherein R is methyl, R' is methoxy, and R" is hydrogen.

4. The compound of claim 1 wherein R is hydrogen, R' is fluorine and R" is methyl.

5. The compound of claim 1 wherein R is methyl, R' is fluorine and R" is hydrogen.

6. The compound of claim 1 wherein R is hydrogen and R' and R" both are fluorine.

7. The compound of claim 1 wherein R' is fluorine, and R and R" are both hydrogen.

8. The compound of claim 1 wherein R is hydrogen, R' is methoxy, and R" is methyl.

References Cited
UNITED STATES PATENTS

| | | | |
|---|---|---|---|
| 3,074,952 | 1/1963 | Casy et al. | 260—293.79 |
| 3,161,637 | 12/1964 | Janssen | 260—293.79 |
| 3,438,991 | 4/1969 | Janssen | 260—326.5 J |

OTHER REFERENCES

J. Med. Chem. 12:435–441 (May 1, 1969), Welstead et al.

HENRY R. JILES, Primary Examiner

S. D. WINTERS, Assistant Examiner

U.S. Cl. X.R.

424—267; 260—651 F, 293.88